United States Patent
Ziemann et al.

(10) Patent No.: US 6,634,809 B1
(45) Date of Patent: Oct. 21, 2003

(54) METHOD FOR OPTICALLY TRANSMITTING SIGNALLING AND CONTROL INFORMATION IN OPTICAL WAVELENGTH MULTIPLEX NETWORKS

(75) Inventors: Olaf Ziemann, Berlin (DE); Andreas Gladisch, Berlin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/446,043

(22) PCT Filed: May 16, 1998

(86) PCT No.: PCT/EP98/02894

§ 371 (c)(1),
(2), (4) Date: May 19, 2000

(87) PCT Pub. No.: WO98/58466

PCT Pub. Date: Dec. 23, 1998

(30) Foreign Application Priority Data

Jun. 18, 1997 (DE) .......................................... 197 25 714

(51) Int. Cl.[7] ................................................ H04J 14/08
(52) U.S. Cl. .......................... 398/79; 398/183; 370/320; 370/335; 370/342; 370/441
(58) Field of Search ................................ 359/124, 181; 370/320, 335, 342, 441

(56) References Cited

U.S. PATENT DOCUMENTS

| | | | | |
|---|---|---|---|---|
| 4,866,699 A | * | 9/1989 | Brackett et al. | 340/825.52 |
| 4,873,681 A | * | 10/1989 | Arthurs et al. | 359/121 |
| 5,508,508 A | * | 4/1996 | Miller | 250/214 LS |
| 5,519,526 A | * | 5/1996 | Chua et al. | 359/118 |
| 5,619,492 A | * | 4/1997 | Press et al. | 359/136 |
| 6,025,944 A | * | 2/2000 | Mendez et al. | 359/123 |

FOREIGN PATENT DOCUMENTS

EP          0 367 452          5/1990

OTHER PUBLICATIONS

Chawki, M.J. et al., "Management Protocol of a Reconfigurable WDM Ring Network Using SDH Overhead Bytes", OFC '96 Technical Digest FD3, pp. 317–318.*

Draft Recommendation ITU–T G.MCS Geneva, Jun., 1996, (document is unknown/unavailable—list of ITC recommendations provided to U.S.P.T.O.).*

Johansson, S., "Transport Network Involving a Reconfigurable WDM Network Layer—A European Demonstration", Journal of Lightwave Technology, vol. 14, No. 6, Jun. 1996, pp. 1341–1348.*

Dixon, R.C., "Spread Spectrum Systems with Commercial Applications", John Wiley and Sons, 1996.*

Viterbi, Andrew J., "CDMA Principles of Spread Spectrum Communication", Addison–Wesley Wireless Communications Series, 1995.*

Nguyen et al., "All–Optical CDMA With Bipolar Codes," Electronics Letters, Bd. 31, Nr. 6, Mar. 16, 1995; pp. 469/470.

Riza et al., "Signaling System for Multiple–Access Laser Communications and Interference Protection," Applied Optics, Bd. 32, Nr. 11, Apr. 10, 1993, pp. 1965–1972.

Giehmann et al., "The Application of Code Division Multiplex Access for Transport Overhead Information in Transparent Optical Networks," Optical Fiber Communication Conference and Exhibition, Bd. 2, 22–27, Feb. 1998, pp. 228–229.

* cited by examiner

Primary Examiner—Leslie Pascal
Assistant Examiner—David C. Payne
(74) Attorney, Agent, or Firm—Kenyon & Kenyon

(57) ABSTRACT

A method for optically transmitting signaling and control information that aids in the monitoring and control of single- or multi-channel useful information in optical wavelength multiplex networks having at least one network element, the signaling and control information and the useful information being transmitted in the form of a digital signal, which is characterized in that the signal of the signaling and control information is transmitted using a code multiplex method (CDMA). Also described is a device for receiving signaling and control information, which is characterized in that the receiving device of the signaling and control information has assigned to it at least one monitor coupler one CDMA decoder, and one signaling device.

16 Claims, 5 Drawing Sheets

METHOD FOR OPTICALLY TRANSMITTING SIGNALLING AND CONTROL INFORMATION IN OPTICAL WAVELENGTH MULTIPLEX NETWORKS

FIELD OF THE INVENTION

The present invention relates to a method for optically transmitting signaling and control information and to a receiving device for signaling and control information.

BACKGROUND INFORMATION

For transmitting a signal carrying useful information, one or a plurality of optical frequencies (wavelengths) is used. If a plurality of optical frequencies is used, they can be considered separate channels. This method is characterized as wavelength multiplex or wavelength division multiplexing (WDM), access to individual channels being possible for at least two network elements. This is characterized as multiple access.

In the operation of optical wavelength multiplex networks, signaling and control information must be transmitted. This signaling and control information functions, on the one hand, for controlling and monitoring network elements and, on the other hand, network conditions can be thus represented and can be changed. A reference (Chawki, M. J. Tholey, V. Le Gac I: Management Protocol of a Reconfigurable WDM Ring,Network Using SDH Overhead Bytes; OFC 96 Technical Digest) describes the signaling and control information bring transmitted within the signal of the useful information (in-channel signaling). In addition, a reference (Draft Recommendation ITU-T G.MCS Geneva Jun. 1996) describes the signaling and control information being transmitted on an additional control channel, either on the same or a different medium. Finally, a reference (S. Johansson: Transport Network Involving a Reconfigurable WDM Layer, Journal of Lightwave Technology 14 (1996) 6, pp. 1341–1349) describes, in which the signaling and control information being transmitted with the assistance of so-called pilot tones. In this context, the pilot tones are transmitted in an electrical frequency range that is not used by the useful information.

In-channel signaling is disadvantageous in that the signaling and control information must be separated from the useful information signal by using additional electrical de-multiplexers and electrical multiplexers, it being necessary first to convert the optical signal in its entire bandwidth into an electrical signal. For processing the signaling and control information, a transceiver (transmitter/receiver) is additionally necessary at each network element.

For the use of additional control channels for the signaling and control information, the separation/addition of the control channels from the channels of the useful information using appropriate means is necessary. In addition, the use of a transceiver is required for the processing of the signaling and control information. Due to the multiple access, it is necessary to use a protocol, which controls the use of the transceiver, i.e., it determines what time the transceiver is to transmit or receive and/or which subscriber can use the transceiver.

The use of pilot tones in optical wavelength multiplex networks having varying hierarchical orders is difficult, since in optical wavelength multiplex networks information can be transmitted at varying transmission rates. Taking into account the entire network structure, no uniformly free frequency ranges for the transmission of pilot tones are generated in this way.

U.S. Pat. No. 5,619,492 describes an optical, local-area network (LAN) in which control information is transmitted in a data packet together with useful information. The entire data packet composed of control information and useful information is CDMA-coded. In a receiving part, the entire data packet is again CDMA decoded.

European Published Patent Application No. 0 367 452 describes an optical network in which information is transmitted in the CDMA method and in the wavelength multiplex method.

A reference (L. Nguyen et al.: "All-Optical CDMA with Bipolar Codes," ELECTRONICS LETTERS, Vol. 31, No. 6, Mar. 16, 1995, pages 469–470) describes a CDMA method in optical networks, bipolar codes being used.

A reference (L. Giehman et al.: "The Application of Code Division Multiple Access for Transport Overhead Information in Transparent Optical Networks," OPTICAL FIBER COMMUNICATION CONFERENCE AND EXHIBITION, Vol. 2, Feb. 22–27, optical networks, the CDMA-coded signaling and control information being impressed upon the signal of the useful information.

SUMMARY OF THE INVENTION

It is an object of the present invention to provide a method for optically transmitting signaling and control information in optical wavelength multiplex networks, requiring no free optical or electrical frequency range and not interfering with the useful information signal to be transmitted.

The object is achieved in the present invention in that the Code Division Multiple Access (CDMA) signal of the signaling and control information is impressed using addition onto the signal of the useful information, the modulation range of the CDMA signal being less than the modulation range of the signal of the useful information. In this context, signaling and control information can be impressed on a multiplex signal existing on an optical fiber (LWL) or on individual channels. By using the code multiplex method, it is possible in an advantageous manner to transmit information selectively to individual network elements or to all network elements using the signaling and control information within an optical wavelength multiplex network. As a result of the fact that the modulation range of the CDMA signal is smaller than that of the useful information signal, influencing the signal of the useful information is substantially avoided. In addition, it is advantageous that the control signal is independent of synchronization with regard to the useful signal. This means that the CDMA signal can be transmitted at a different transmission rate than the useful information. For the detailed description of the CDMA method, two references are noted (R.C. Dixon: "Spread Spectrum Systems"; John Wiley and Sons, 1996 and A. J. Viterbi: "CDMA Principles of Spread Spectrum Communications"; Addison-Wesley, 1995).

Furthermore, it is advantageous that an identification (addressing) of a network element can take place via a specifiable code. This code can be unipolar or bipolar, or, if appropriate, also multi-step. In the use of the CDMA method, one bit of the signaling and control information to be transmitted is linked to a code word so that a code sequence arises which is composed of a plurality of chips. The individual bits of the code sequence are termed "chips" so as to avoid any confusion with the bits of the signaling and control information. By assigning the code words to individual network elements, the latter can be addressed. Thus, in an advantageous manner, it is possible to address individual network elements. For this purpose, a corresponding code word is to be clearly assigned using software to the network elements to be addressed. To be able to address a plurality of network elements of an optical wavelength multiplex network, a multiplicity of code words of this type may be employed in each case, however, at least one code word being clearly assigned to a network element. For example, it is nevertheless also possible to assign to code words to a network element representing, in this case, the information "0" or "1". It is advantageous if the individual code words of the corresponding network elements are orthogonal to each other, a plurality of code words then constituting a so-called code family. By using a corresponding chip quantity (code word length), it is possible to be able to address virtually any number of network elements.

If a CDMA-coded bit of signaling and control information is transmitted to a network element that has a corresponding code word in its software, the bit can be identified in that, first, both code words are multiplied, with respect to chips, and then the individual multiplication results are added. Thus, for example, in a four-chip code word, the maximum sum possible is 4. As a result of transmission errors or noise, it is possible that individual chips are not clearly recognized or even are lost. The loss of a chip means that as the sum only the amount of 3 is calculated. However, here, too, the result is clear, since, for example, a multiplication with respect to chips and subsequent addition using a false code word that is orthogonal to the correct one, yields a result of 0. In this manner, a clear assignment of a bit of signaling and control information to a network element is possible. In addition, through the multiplication with respect to chips and subsequent addition, there results a so-called coding gain, since the original bit having the value of 1 receives the value 4 through the CDMA coding and the subsequent decoding. In this way, the signal-to-interference ratio is improved, i.e., a coding gain is achieved. In addition, it is possible in an advantageous manner by selecting a specifiable code to transmit in a particular manner particularly important signaling and control information.

In according to the present invention in impressing the signal of the signaling and control information on an envelope curve of the useful signal through intensity modulation, a small modulation index is selected.

In a further preferred embodiment of the method, provision is made that the CDMA-coded signal of the signaling and control information and the signal of the useful information are generated in a common network element as a summing signal. This means that both the CDMA-coded signal as well as the signal of the useful information are generated in a common transmitter (modulator). This happens as a result of the fact that the signals that are available at first as electrical pulses are converted into optical signals using an appropriate device, in the process the CDMA-coded signal being already impressed upon the signal of the useful information. Alternatively, provision can be made that the CDMA-coded signal of the signaling and control information is impressed on the signal of the useful information generated in a network element using a further network element.

The summing signal that arises in this manner including the CDMA-coded signal and the signal of the useful information, can be received by a further network element. A plurality of summing signals may be combined into at least one wavelength multiplex signal.

In according to the present invention provision is made that at the input of a network element, for generating the summing signal or wavelength multiplex signal, a supplemental signal identical to it is generated. This occurs preferably using a so-called monitor coupler. The monitor coupler can be assigned to an optical fiber, which carries the wavelength multiplex signal. An optical filter element can be arranged advantageously downstream of the monitor coupler, the filter element then filtering out of the wavelength multiplex signal at least one summing signal of an optical channel. Alternatively, provision can be made that the monitor coupler be assigned to an optically selective element, in which the wavelength multiplex signal is divided into individual summing signals in accordance with the wavelengths employed. The monitor coupler is then assigned to at least one optical fiber that carries a summing signal. In this manner, it is possible to dispense with the filter element just described. This means that the summing signal can be relayed directly from the monitor coupler to a CDMA decoder.

The currently existing summing signal is detected by the CDMA decoder. For this purpose, the decoder is configured such that it only detects the signals of the signaling and control information. This is possible due to the fact that the useful information is transmitted at a significantly higher transmission rate (M-bit range) than the signaling and control information (k-bit range). In the CDMA decoder, the transmitted code words are compared with the code word stored in the CDMA decoder. In the event of agreement— as described above— the original bit sequence of the signaling and control information can be recovered, the latter being converted into the electrical area. In this manner, a processing is possible in a suitable downstream device. In this processing, on the one hand, control information for a network element is evaluated, whereas, on the other hand, it is possible that further signaling and control information can be generated so that further network elements can be controlled or monitored. Subsequently, this new signal of the signaling and control information may be again CDMA coded and may be impressed on the signal of the useful information. In an advantageous manner, the conversion of the useful information into the electrical range can be dispensed with, which leads to a simplification and cost reduction of the entire network.

In addition, the present invention relates to a device for receiving signaling and control information, which is characterized in that the receiving device of the signaling and control information has at least one monitor coupler and one signaling device. The monitor coupler, according to the present invention, generates a supplemental signal that is identical to the received signal that includes signaling and control information and useful information, the supplemental signal being fed to the CDMA decoder, which filters the signaling and control information from this signal and, subsequently, decodes it, and in that the decoded signaling and control information is fed to the signaling device, which controls the network element. In particular, as a result of the fact that the monitor coupler generates this supplemental signal from which in the CDMA decoder the control information is filtered out, it is possible to dispense with a recovery of the useful information, since the signaling and control information are impressed upon the useful signal and therefore can easily be separated from it.

In another embodiment the device according to the present invention, provision is made that the device have assigned to it a transmitting device including a code multiplex coder. In this way, it is possible to code once again the information generated in the signaling device so that it can subsequently be impressed on the signal of the useful information through addition using a modulator.

The invention will now be discussed in greater detail with reference to the drawings.

BRIEF DESCRIPTION OF THE DRAWINGS

FIG. 6b shows a refinement of the embodiment illustrated in FIG. 6a.

DETAILED DESCRIPTION

Figure 1:
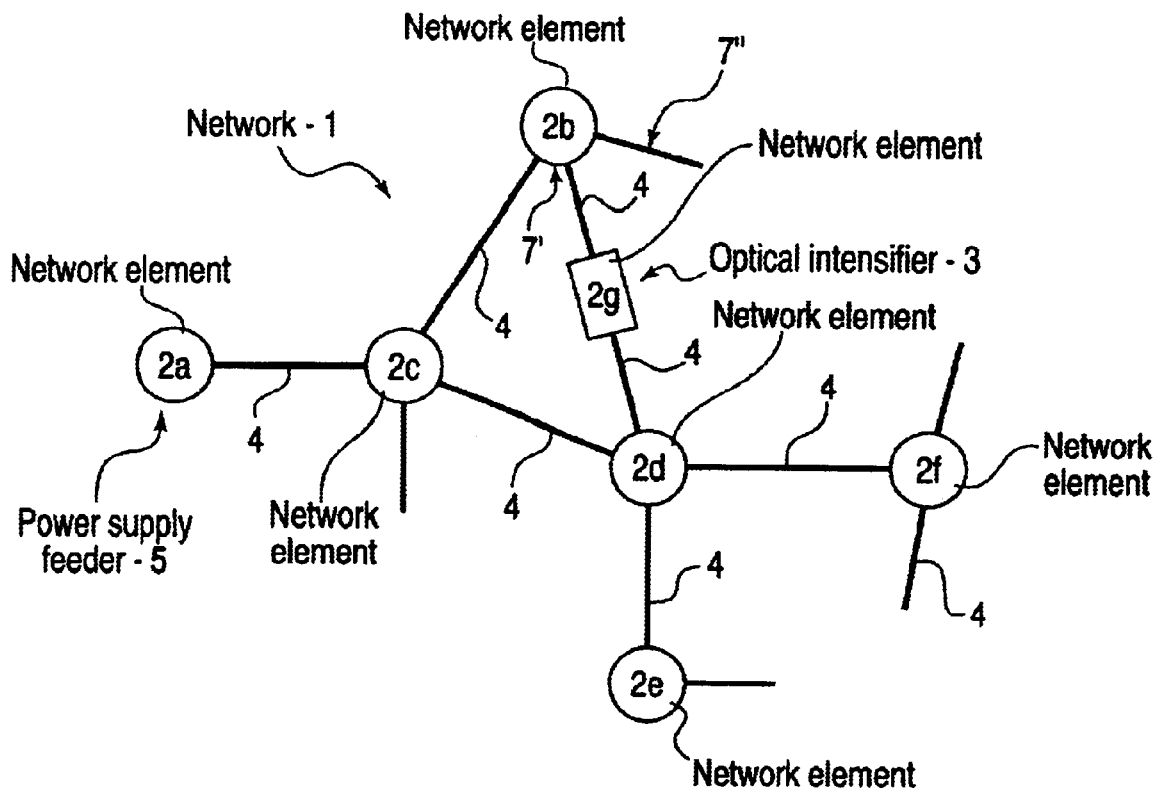
FIG. 1 shows in a cutaway view an optical wavelength multiplex network for transmitting useful information according to the present invention.

FIG. 1 shows in a cutaway view an optical wavelength multiplex network 1, which includes network elements 2a through 2g. Network elements 2a through 2f are also termed network nodes. Network element 2g is, for example, an optical intensifier 3. Individual network elements 2a through 2g are connected by optical fibers (hereinafter designated as "LWL") 4. Network element 2a can be configured as power supply feeder 5, which only contains a transmitting device for optical signals.

Figure 2:
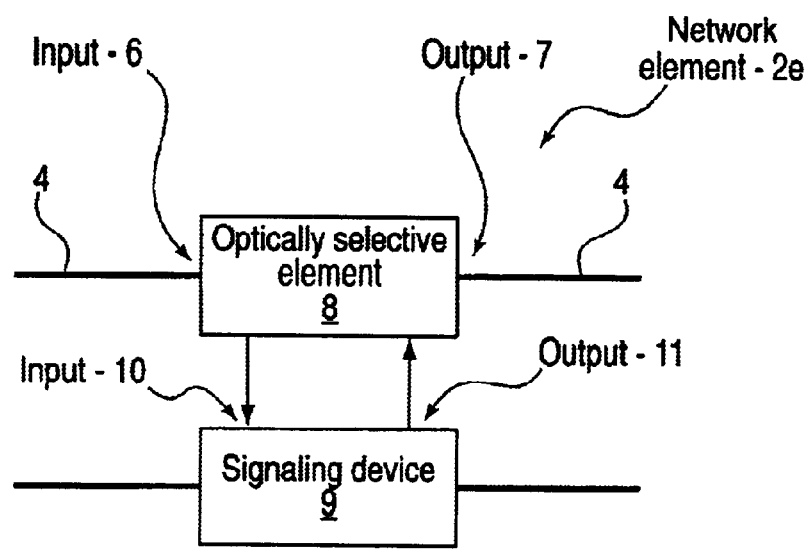
FIG. 2 shows a block diagram of a network element according to the present invention.

In FIG. 2, network element 2e is depicted. It is only connected to two optical fibers 4, it being presumed in what follows purely by way of example, that network element 2e has an input 6 and output 7, to which LWL 4 are connected. Network element 2e includes an optically selective element 8 as well as a signaling device 9, which functions to evaluate and process the signaling and control information. It is discernible that signaling device 9 has an input 10 and output 11. Network element 2e has assigned to it a receiving device 12, which is arranged between element 8 and input 10 of signaling device 9, (FIG. 3).

Receiving device 12 for signaling and control information includes a monitor coupler 13 (monitor branch), an optical wavelength selective element, in particular a filter 14, a receiver 15, which makes possible an optical/electrical conversion of a signal, and a CDMA decoder 16. Receiving device 12 is connected to input 10 of signaling device 9. Element 8 is— as was previously mentioned— coupled to an LWL 4 at input 6 and at output 7, respectively. Monitor coupler 13 is assigned to input 6 of element 8, and is connected via an LWL 4' to filter 14, which in turn is connected to receiver 15 via a further LWL 4'. Receiver 15 converts an optical signal into an electrical signal and feeds it to CDMA decoder 16 via a line 4". CDMA decoder 16 is conductively connected to signaling device 9.

Figure 3:
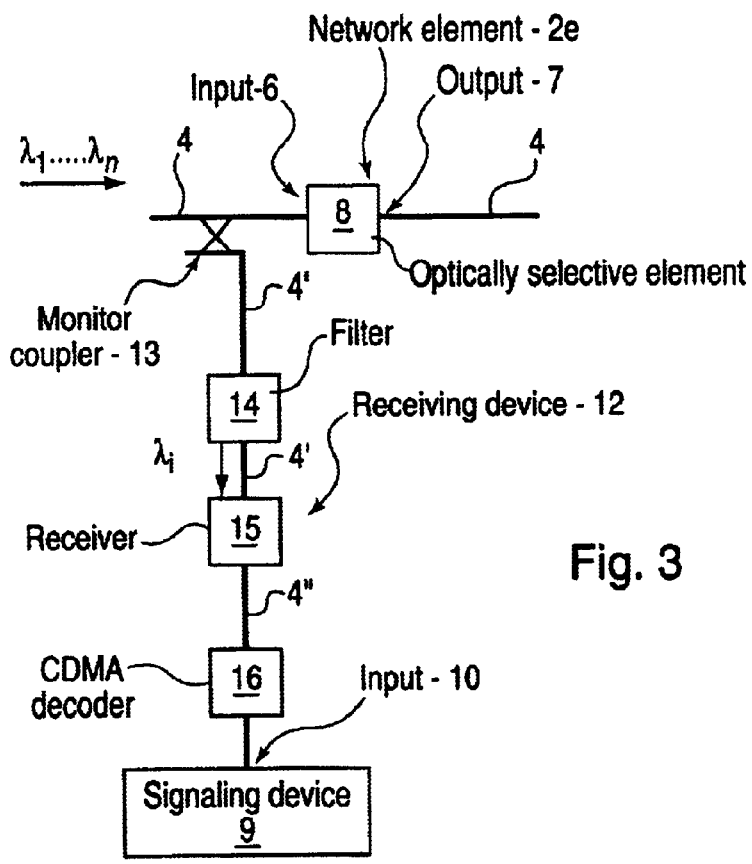
FIG. 3 shows a first embodiment of a receiving device according to the present invention of the network element as illustrated in FIG. 2.

In what follows, the mode of functioning of the receiving device is described in greater detail on the basis of FIG. 3, it being presupposed that a wavelength multiplex signal having wavelengths $\lambda_1$ through $\lambda_n$ has been supplied at network element 2a, it then being possible to pick off/tap off the wavelength multiplex signal at input 6 of optical element 8.

Monitor coupler 13, by way of example, using power division generates two wavelength multiplex signals, identical to each other, having wavelengths $\lambda_1$ through $\lambda_n$, one part of the signal arriving at element 8 and the other part of the signal being supplied via LWL 4' to filter 14. Filter 14 is configured such that it advantageously filters out from the wavelength multiplex signal only one wavelength $\lambda_i$. Thus at the output of filter 14, a summing signal is present having wavelength $\lambda_i$, the summing signal being fed via LWL 4' to receiver 15. Receiver 15 converts the summing signal into an electrical signal and feeds it via line 4" to CDMA decoder 16. CDMA decoder 16 is in particular configured such that it does not recognize the signal of the useful information, which, by way of example, can be achieved in that it contains a filter function using which it is possible to recognize from the summing signal only the CDMA-coded signal of the signaling and control information. This is possible due to the fact that the useful information is transmitted at a significantly higher transmission rate than the signaling and control information, so that here provision can be made for an electrical filter element. In this way, the transmission of signaling and control information takes place in an asynchronous manner in comparison to the useful signal.

In CDMA decoder 16, a code word is stored using software, the code word functioning as a key for the signaling and control information provided for this network element 2e, and the latter information can be decoded in this way. After the signaling and control information has been decoded, it is relayed to signaling device 9. The device evaluates this information and controls, for example, network element 8. Control of this type can be provided if network element 2e has a further output. Then it is possible to divide the wavelength multiplex signal downstream of input 6 into different partial signals, the partial signals being relayed to the outputs. Element 8 thus takes on a sort of switching function for the wavelength multiplex signal. The division of the wavelength multiplex signal, i.e., which wavelengths are made available at which output, controls signaling device 9 on the basis of the signaling and control information made available to it.

Figure 4:
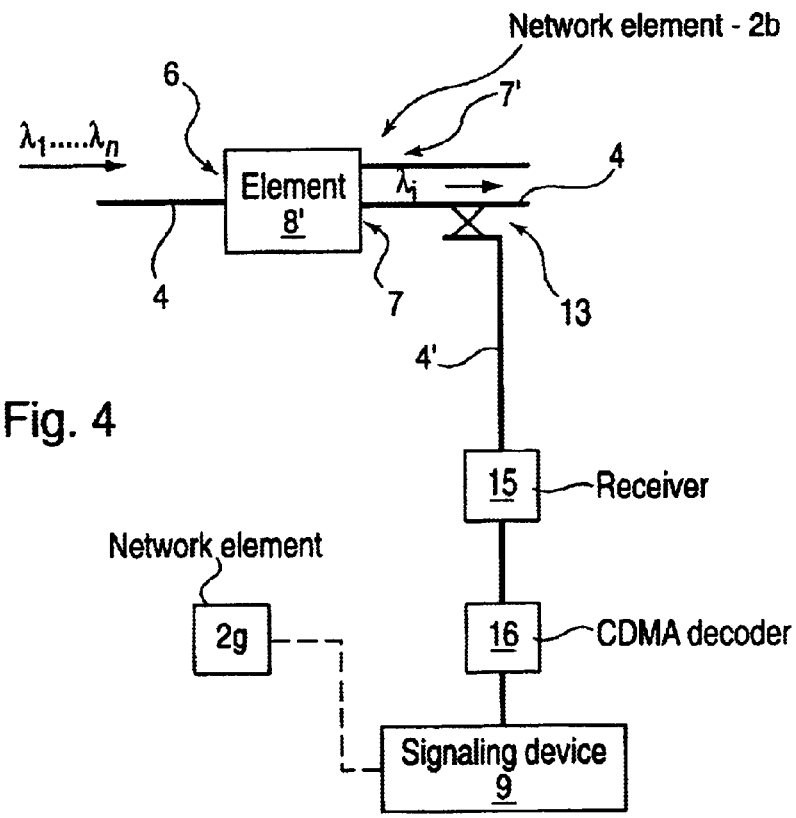
FIG. 4 shows a second embodiment of the receiving device according to the present invention.

In FIG. 4, for a further embodiment of the receiving device, according to the present invention network element 2b is considered, purely by way of example. It has an element 8', which includes an input 6 as well as two outputs 7 and 7'. At input 6, the wavelength multiplex signal having wavelengths $\lambda_1$ through $\lambda_n$ is available. Element 8' divides this wavelength multiplex signal, for example, such that at output 7 only one signal is applied, which has only one wavelength $\lambda_i$. Therefore, here there already exists one single summing signal, which in turn is divided by monitor coupler 13 into two identical partial signals. A partial signal reaches receiver 15 via LWL 4', the receiver in turn undertaking a conversion from the optical area into the electrical area, and the electrical signal is relayed to CDMA decoder 16. CDMA decoder— as was already described— is conductively connected to signaling device 9. The other partial signal is fed to network element 2g at output 7' via LWL 4, being intensified in network element 2g and transferred to network node 2d.

The signaling and control information is decoded, in the embodiment illustrated in FIG. 4, in the same manner as in the embodiment illustrated in FIG. 3, it being possible to dispense with only filter 14, since no wavelength multiplex signal is available at monitor coupler 13, rather it being useful to pick off a summing signal.

Furthermore, is obvious in FIG. 4, network element 2g is connected to signaling element 9. This can take place either via the already available LWL or using a radio connection or an electrical line. As was already mentioned, network element 2g is an optical intensifier 3, which can intensify an optical signal which has been weakened by losses in the optical fiber. For example, the degree of intensification of intensifier 3 can be regulated using signaling device 9, although it is also possible to relay error messages of amplifier 3 to signaling device 9. These error messages can then be advantageously retrieved at the location of network element 2b, so that repair measures or maintenance work can be begun. Signaling device 9 as illustrated with FIG. 4— as was described above — controls optically selective element 8'.

Figure 5:
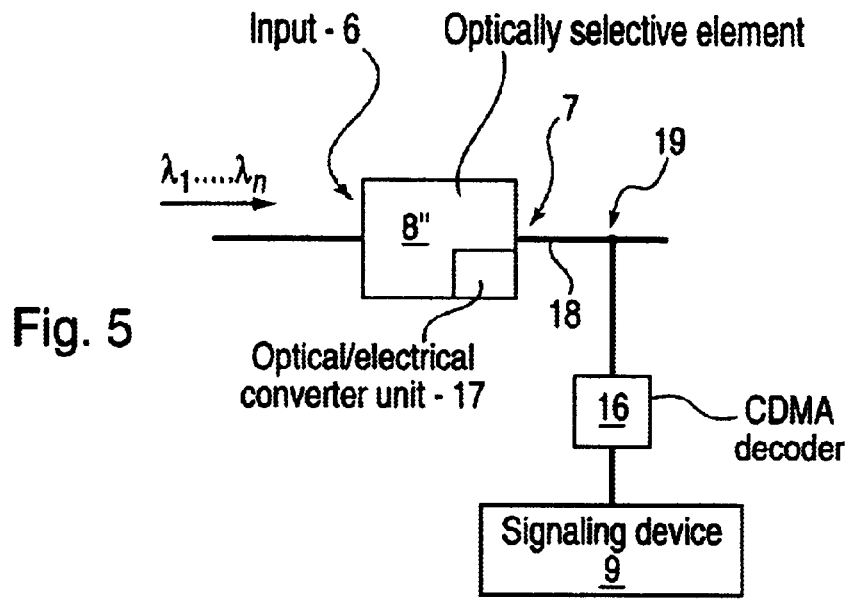
FIG. 5 shows a third embodiment of the receiving device according to the present invention.

This embodiment according to the present invention as illustrated in FIG. 5 depicts an element 8", to whose input 6 the wavelength multiplex signal is fed. Element 8" includes an optical/electrical converter unit 17, which converts the wavelength multiplex signal into an electrical signal. Output 7 of element 8", in this context, is an electrical line 18, from which a branch 19 is conductively connected to CDMA decoder 16. CDMA decoder 16 operates in the same manner as described above, so that reference may be made to the corresponding description passages.

Downstream of branch 19, electrical line 18 leads to a modulator (not depicted), which converts the electrical signal again into an optical signal.

Figure 6A:
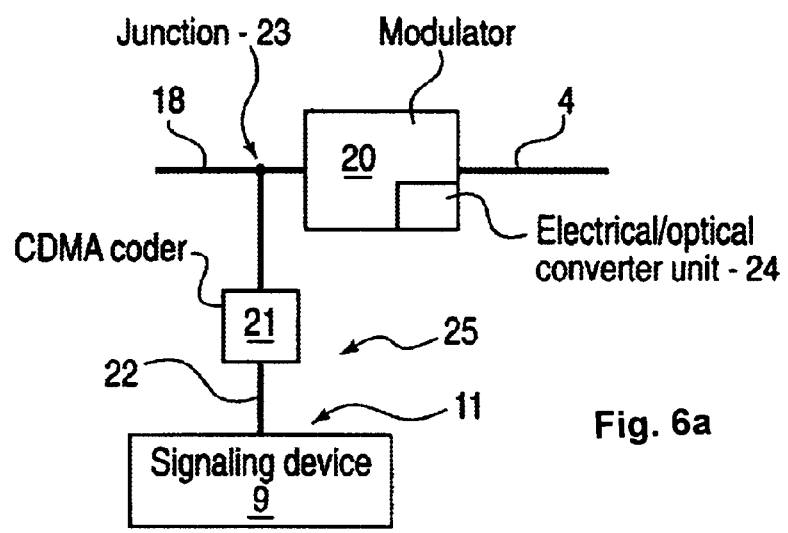
FIG. 6a shows a first embodiment of a transmitting device according to the present invention of the network element as illustrated in FIG. 2.

A modulator 20 of this type is depicted in FIG. 6a. After signaling device 9 has received the signaling and control information, has evaluated it, and possibly generated new signaling and control information, the latter is fed at output 11 of signaling device 9 to a transmitting device 25 via an electrical connecting line 22, transmitting device 25 having a CDMA coder 21. CDMA coder 21 links the individual bits of the signaling and control information to a code word, so that the information can be assigned to a further network element. After the CDMA coding, a transfer takes place via electrical connecting line 22' to a junction 23, so that a summing signal can be fed in electrical form to modulator 20. Modulator 20 contains an electrical/optical converter unit 24, which converts the electrical summing signal into an optical signal. The signal of the signaling and control information is already impressed on this summing signal. It is fed to network 1 via LWL 4.

Figure 6B:
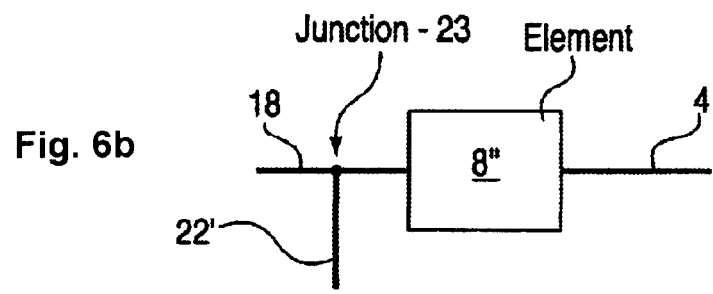

Alternatively, provision can be made— as is depicted in FIG. 6b— that, in place of modulator 20, an element 8''' is provided for which on the input side has an electrical connection. Inside element 8''' there takes place the electrical/optical conversion into a signal that is fed then to network 1 via an LWL 4. Reference is made to FIG. 6a for the description of transmitting device 25.

Figure 7:
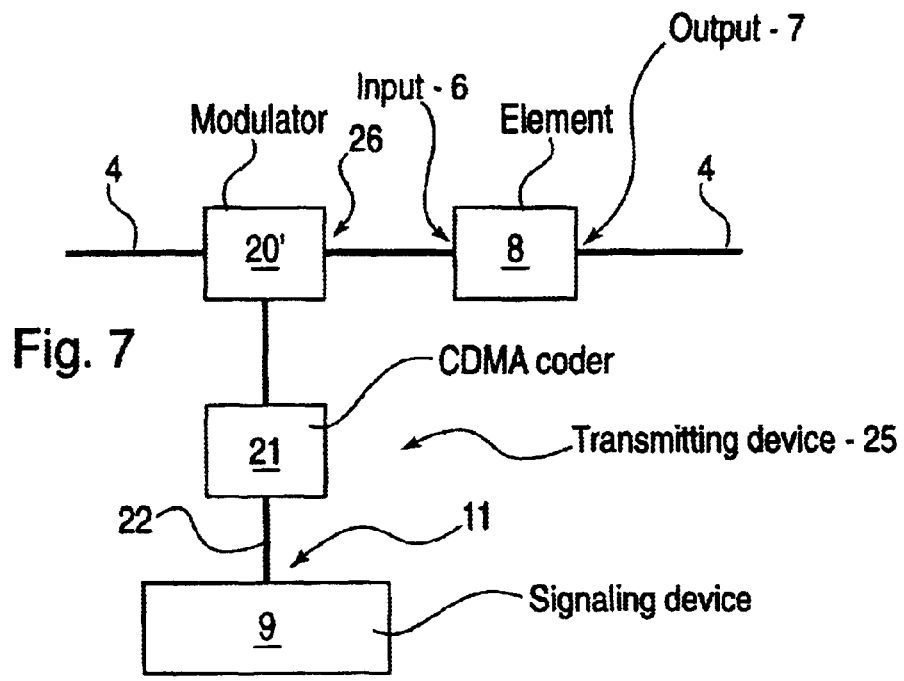
FIG. 7 shows a second embodiment of the transmitting device according to the present invention.

FIG. 7 depicts a modulator 20', using which it is possible using addition to impress onto an optical signal a signal having signaling and control information, emitted by transmitting device 25, the former signal being made available to the latter signal via LWL 4. Using this signal, the useful information is transmitted. Through addition of the two signals, there arises at output 26 of the modulator a summing signal which is fed via input 6 to element 8. At its output 7, the summing signal is again fed to network 1 via LWL 4.

Figure 8:
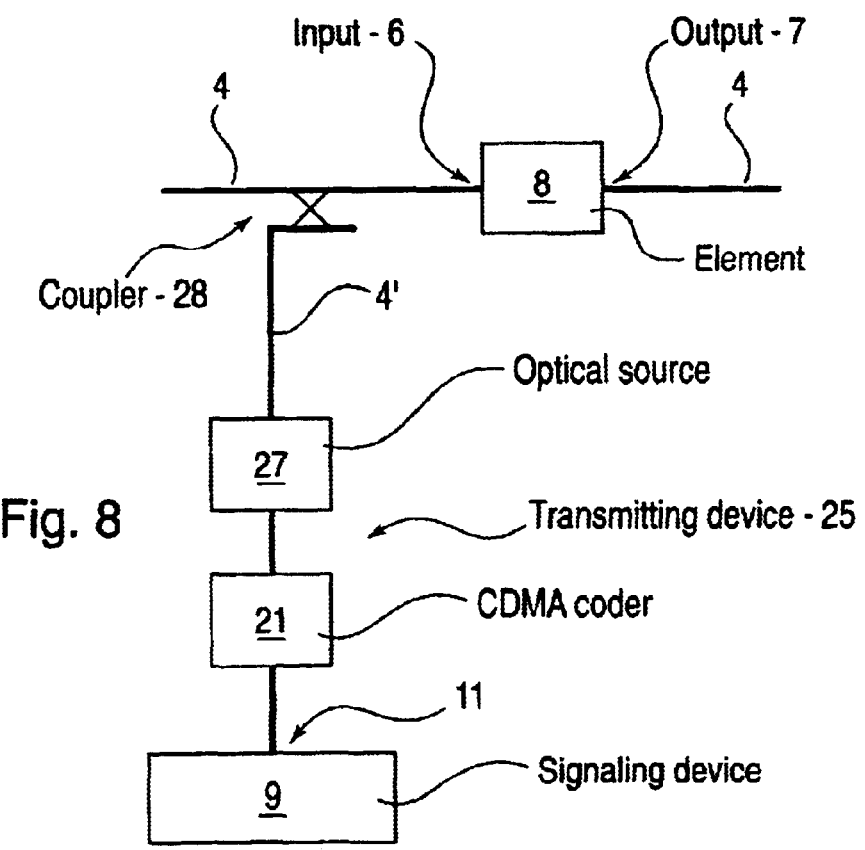
FIG. 8 shows a third embodiment of the transmitting device according to the present invention.

A further embodiment of a transmitting device 25 is depicted in FIG. 8. Transmitting device 25 has an optical source 27, which converts the CDMA-coded information from signaling device 9, or from CDMA coder 21, into optical signals. Via an LWL 4', the signaling and control information is coupled via a coupler 28 into LWL 4. In this manner, a summing signal can already be relayed to element 8, the summing signal containing the useful information and the signaling and control information.

Figure 9:
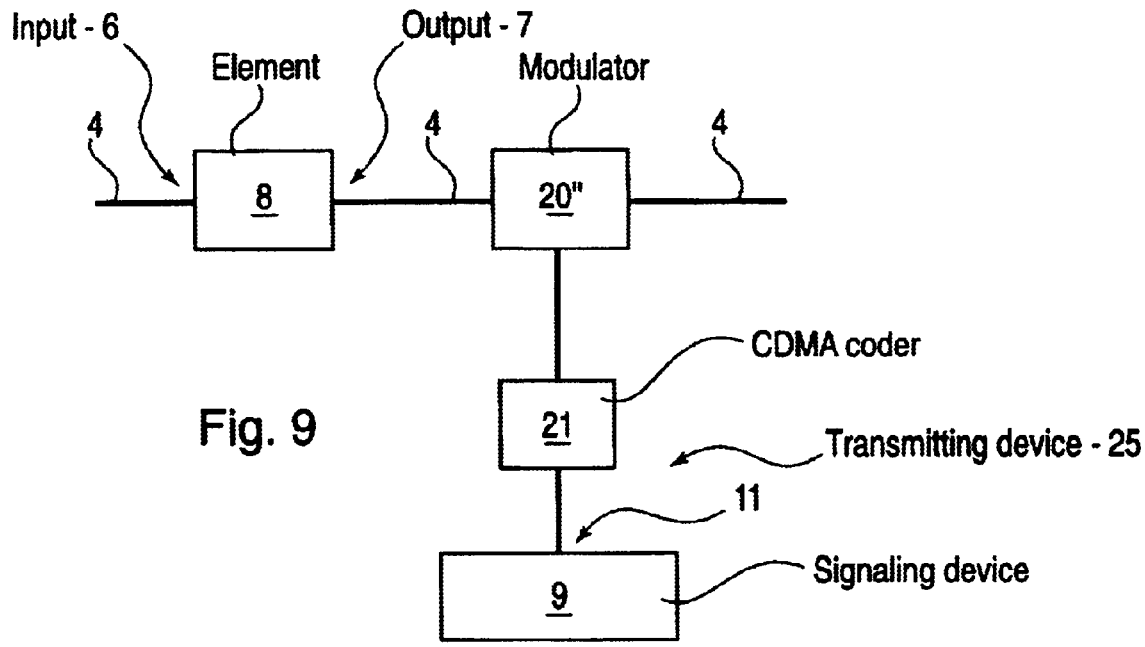
FIG. 9 shows a fourth embodiment of the transmitting device according to the present invention.

Alternatively, with respect to FIG. 8, provision can be made that downstream of an element 8 a modulator 20" is arranged which functions subsequently to impress CDMA-coded signaling and control information from transmitting device 25 onto the useful signal, so that the useful signal can be fed via LWL 4 to network 1 as a summing signal (see FIG. 9). Identical or identically functioning parts such as were mentioned in the preceding description sections are provided with the same reference numerals. In this regard, reference is made to the corresponding explanations.

Figure 10:
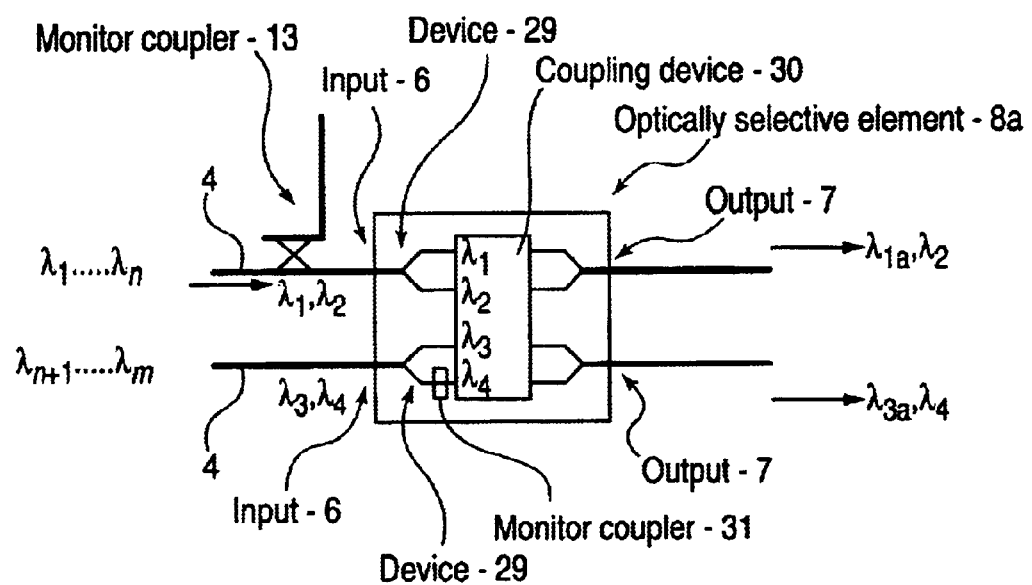
FIG. 10 shows an embodiment of an optically selective element according to the present invention.

FIG. 10 depicts an optically selective element 8a, which, in contrast to optically selective element 8, has two inputs 6 and two outputs 7. At one input 6, for example, via LWL 4 a wavelength multiplex signal having wavelengths $\lambda_1$ through $\lambda_n$ is applied. At other input 6, a further wavelength multiplex signal having wavelengths $\lambda_{n+1}$ through $\lambda_m$ is available. For the following description, the assumption is made, purely by way of example, for reasons of simplicity, that at each input 6 of element 8a a wavelength multiplex signal is available which is composed only of two different wavelengths. For example, these can be wavelengths $\lambda_1$ and $\lambda_2$ as well as wavelengths $\lambda_3$ and $\lambda_4$.

The wavelength multiplex signal ($\lambda_1, \lambda_2$) can be picked off via a monitor coupler 13. Monitor coupler 13 is preferably connected to filter 14 as illustrated in FIG. 3. In this regard, for the processing of this signal reference is made to the corresponding description.

Element 8a functions to separate and/or to exchange individual channels of wavelength multiplex signals from/among each other. For this purpose, element 8a has at inputs 6 in each case a device 29, which is provided for making available in separated form the individual wavelengths of a multiplex signal. A coupling device 30 arranged downstream of device 29 makes it possible once again to divide the individual channels — in accordance with the control specifications— from the signaling and control information. This means that after the multiplex signals have been divided into individual summing signals, a wavelength conversion of the desired summing signals takes place in coupling device 30. In this way, it is possible that a wavelength multiplex signal is available at the outputs which has wavelengths $\lambda_1$ and $\lambda_2$ and a further wavelength multiplex signal has wavelengths $\lambda_3$ and $\lambda_4$, although, for example, the information of input-side wavelength $\lambda_3$ is contained in output-side wavelength $\lambda_1$a. Output-side wavelength $\lambda_3$a then contains preferably the information of input-side wavelength $\lambda_1$.

In addition, element 8a has designed to it a further monitor coupler 31, which purely by way of example, is here assigned to the electrical line of wavelength $\lambda_4$. A monitor coupler 31 of this type can also be assigned to a plurality of electrical lines within element 8a.

It is also obviously possible to furnish element 8a with more than two inputs and outputs, the number of inputs preferably corresponding to the number of outputs.

Element 8a illustrated in FIG. 10 may be modified in accordance with the preceding explanations. For example, it can have an electrical input and an optical output or vice versa, so that this element 8a can be applied in all of the embodiments described above.

Finally, it should be noted that all of the receiving devices and transmitting devices can be combined with each other in any way desired, after the appropriate modification.

What is claimed is:

1. A method for optically transmitting signaling and control information, comprising the steps of:

aiding monitoring and control in an optical wavelength multiplex network via the signaling and control information, the optical wavelength multiplex network including at least one network element, transmitting useful information in the optical wavelength multiplex network in one of a single channel mode and a multi-channel mode, transmitting the signaling and control information and the useful information in digital signal form;

transmitting the signal and control information via a CDMA operation;

additively impressing a CDMA signal of the signal and control information onto a signal of the useful information; and providing a modulation range of the CDMA signal that is smaller than a modulation range of the signal of the useful information.

2. The method according to claim 1, wherein a code for the CDMA operation is at least one of a unipolar code, a bipolar code and a multi-step code.

3. A method for optically transmitting signaling and control information, comprising the steps of:

aiding monitoring and control in an optical wavelength multiplex network via the signaling and control information, the optical wavelength multiplex network including at least one network element;

transmitting useful information in the optical wavelength multiplex network in one of a single channel mode and a multi-channel mode, transmitting the signaling and control information and the useful information in digital signal form;

transmitting the signal and control information via a CDMA operation;

additively impressing a CDMA signal of the signal and control information onto a signal of the useful information, wherein the step of additively impressing includes the step of applying an intensity modulation onto an envelope curve of a signal of at least one channel of the useful information; and providing a modulation range of the CDMA signal that is smaller than a modulation range of the signal of the useful information.

4. The method according to claim 1, further comprising the step of:

generating the CDMA signal and the signal of the useful information as a summing signal in an assembly of the at least one network element.

5. The method according to claim 1, wherein the step of additively impressing includes the step of impressing, via a modulator, the CDMA signal onto the signal of the useful information that is generated in the at least one network element.

6. The method according to claim 1, further comprising the step of receiving at the at least one network element a summing signal including the CDMA signal and the signal of the useful information.

7. The method according to claim 6, further comprising the step of:

generating a supplemental signal in response to receiving the summing signal, the supplemental signal being identical to the received summing signal.

8. The method according to claim 7, wherein the step of transmitting the useful information in the optical wavelength multiplex network includes the step of transmitting the useful information in the multi-channel mode, and further comprising the step of separating the summing signal from a wavelength multiplex signal via a filter.

9. The method according to claim 8, wherein the summing signal includes a useful channel, the useful channel including corresponding signaling and control information.

10. The method according to claim 8, further comprising the step of:

recovering the signaling and control information from the summing signal via a receiver and a CDMA decoder.

11. The method according to claim 8, further comprising the step of:

recovering the signaling and control information if a transmitted code word to which a bit of a digital signal of the signaling and control information is linked corresponds to a code word stored in a receiver.

12. The method according to claim 10, further comprising the steps of:

processing the recovered signaling and control information;

coding the recovered and the processed signaling and control information via the CDMA operation; and impressing the coded signaling and control information onto the signal of the useful information.

13. A device for receiving signaling and control information, the signaling and control information being transmitted according to a CDMA operation and aiding monitoring and control in an optical wavelength multiplex network, the optical wavelength multiplex network including at least one network element, a useful information being transmitted in the optical wavelength multiplex network in one of a single channel mode and a multi-channel mode, a signal of the signaling and control information and a signal of the useful information being transmitted in digital form, comprising:

at least one monitor coupler generating a supplemental signal, the supplemental signal being identical to a received signal that includes the signal of the signaling and control information and the signal of the useful information;

a CDMA decoder coupled to the at least one monitor coupler, the CDMA decoder receiving the supplemental signal, the CDMA decoder filtering and decoding the signaling and control information from the supplemental signal; and a signaling device coupled to the CDMA decoder, the signaling device receiving the decoded signaling and control information, the signaling device controlling the at least one network element.

14. The device according to claim 13, further comprising:

a filter coupled to the at least one monitor coupler, the filter filtering a summing signal from the supplemental signal, the summing signal including a CDMA signal of the signaling and control information and the signal of the useful information.

15. The device according to claim 13, further comprising:
a transmitting device coupled to the signaling device, the transmitting device transmitting the signaling and control information to the optical wavelength multiplex network, the signaling and control information being generated from the signaling device.

16. The device according to claim 15, wherein the transmitting device includes a CDMA coder, the CDMA coder coding new signaling and control information.

* * * * *